United States Patent
Insley et al.

(10) Patent No.: US 7,805,629 B2
(45) Date of Patent: Sep. 28, 2010

(54) PROTECTING DATA TRANSACTIONS ON AN INTEGRATED CIRCUIT BUS

(75) Inventors: Mark W. Insley, Sunnyvale, CA (US); Thomas C. Holland, Mountain View, CA (US); Pradeep K. Kalra, San Jose, CA (US); Peter F. Snyder, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 525 days.

(21) Appl. No.: 11/073,045

(22) Filed: Mar. 4, 2005

(65) Prior Publication Data

US 2006/0200641 A1    Sep. 7, 2006

(51) Int. Cl.
- G06F 15/16 (2006.01)
- G06F 15/177 (2006.01)
- G06F 11/00 (2006.01)

(52) U.S. Cl. .......................... 714/5; 709/219; 709/223; 714/13

(58) Field of Classification Search ................. 714/823, 714/749, 751, 52; 709/219, 223; 725/96
See application file for complete search history.

(56) References Cited

U.S. PATENT DOCUMENTS

| | | | |
|---|---|---|---|
| 4,670,880 A | 6/1987 | Jitsukawa et al. | |
| 5,241,549 A * | 8/1993 | Moon et al. | 714/823 |
| 5,555,438 A * | 9/1996 | Blech et al. | 710/30 |
| 5,664,101 A * | 9/1997 | Picache | 709/250 |
| 5,761,683 A | 6/1998 | Logan et al. | |
| 5,815,652 A | 9/1998 | Ote et al. | |
| 5,822,514 A * | 10/1998 | Steinz et al. | 714/49 |
| 5,881,078 A * | 3/1999 | Hanawa et al. | 714/823 |
| 6,170,067 B1 | 1/2001 | Liu et al. | |
| 6,195,353 B1 | 2/2001 | Westberg | |
| 6,216,226 B1 | 4/2001 | Agha et al. | |
| 6,237,103 B1 | 5/2001 | Lam et al. | |
| 6,253,300 B1 | 6/2001 | Lawrence et al. | |
| 6,275,526 B1 * | 8/2001 | Kim | 375/238 |
| 6,335,967 B1 | 1/2002 | Blomkvist | |
| 6,446,141 B1 | 9/2002 | Nolan et al. | |

(Continued)

FOREIGN PATENT DOCUMENTS

EP    0 621 706 A    10/1994

(Continued)

OTHER PUBLICATIONS

Philips Semiconductors, The I2C Bus Specification, Jan. 2000, Version 2.1-2000, p. 6,7,10,13-15.*

(Continued)

Primary Examiner—Robert Beausoliel
Assistant Examiner—Jeison C Arcos
(74) Attorney, Agent, or Firm—Perkins Coie LLP

(57) ABSTRACT

Provided is a method and system for protecting data transactions transmitted on an integrated circuit bus. Specifically, by transmitting data along with the complement of the data from one component to another component that are connected by the integrated circuit bus, the data and complemented data can be compared for errors. Exemplary errors include bit flips. Comparisons include logical operations, such as XOR, that determine if an error has occurred during the transmission of the data or complemented data on the integrated circuit bus.

37 Claims, 5 Drawing Sheets

U.S. PATENT DOCUMENTS

| | | | |
|---|---|---|---|
| 6,480,850 B1 | 11/2002 | Veldhuisen | |
| 6,502,088 B1 | 12/2002 | Gajda et al. | |
| 6,502,208 B1 | 12/2002 | McLaughlin et al. | |
| 6,507,929 B1 * | 1/2003 | Durham et al. | 714/823 |
| 6,574,518 B1 | 6/2003 | Lounsberry et al. | |
| 6,586,911 B1 * | 7/2003 | Smith et al. | 320/134 |
| 6,645,077 B2 | 11/2003 | Rowe | |
| 6,651,190 B1 * | 11/2003 | Worley et al. | 714/43 |
| 6,690,733 B1 * | 2/2004 | Baumgartner et al. | 375/259 |
| 6,697,962 B1 | 2/2004 | McCrory et al. | |
| 6,728,908 B1 * | 4/2004 | Fukuhara et al. | 714/48 |
| 6,920,502 B2 | 7/2005 | Araujo et al. | |
| 6,925,531 B2 | 8/2005 | Konshak et al. | |
| 6,976,058 B1 | 12/2005 | Brown et al. | |
| 7,003,563 B2 | 2/2006 | Leigh et al. | |
| 7,114,102 B2 | 9/2006 | Chan et al. | |
| 7,234,051 B2 | 6/2007 | Munguia et al. | |
| 7,257,741 B1 | 8/2007 | Palenik et al. | |
| 7,466,713 B2 * | 12/2008 | Saito | 370/401 |
| 7,584,337 B2 | 9/2009 | Rowan et al. | |
| 2001/0056483 A1 * | 12/2001 | Davis et al. | 709/224 |
| 2002/0078231 A1 | 6/2002 | Chang et al. | |
| 2002/0129305 A1 | 9/2002 | Ahrens et al. | |
| 2002/0133581 A1 * | 9/2002 | Schwartz et al. | 709/223 |
| 2002/0156840 A1 | 10/2002 | Ulrich et al. | |
| 2003/0033361 A1 | 2/2003 | Garnett et al. | |
| 2003/0061320 A1 | 3/2003 | Grover et al. | |
| 2003/0088655 A1 | 5/2003 | Leigh et al. | |
| 2003/0088805 A1 * | 5/2003 | Majni et al. | 714/6 |
| 2003/0163651 A1 | 8/2003 | Jain et al. | |
| 2003/0200266 A1 | 10/2003 | Henry | |
| 2004/0093592 A1 | 5/2004 | Rao | |
| 2004/0133643 A1 | 7/2004 | Warren et al. | |
| 2004/0136720 A1 | 7/2004 | Mahowald et al. | |
| 2004/0177178 A1 | 9/2004 | Gregg et al. | |
| 2004/0215948 A1 | 10/2004 | Abbey et al. | |
| 2005/0021722 A1 | 1/2005 | Metzger | |
| 2005/0033952 A1 | 2/2005 | Britson | |
| 2005/0044170 A1 | 2/2005 | Cox et al. | |
| 2005/0044207 A1 | 2/2005 | Goss et al. | |
| 2005/0125118 A1 | 6/2005 | Chalker et al. | |
| 2005/0129035 A1 * | 6/2005 | Saito | 370/401 |
| 2005/0144493 A1 | 6/2005 | Cromer et al. | |
| 2005/0165989 A1 | 7/2005 | Kim | |
| 2005/0188071 A1 | 8/2005 | Childress et al. | |
| 2005/0193021 A1 * | 9/2005 | Peleg | 707/200 |
| 2005/0288828 A1 * | 12/2005 | Claseman | 701/1 |
| 2005/0289548 A1 | 12/2005 | Farchi et al. | |
| 2006/0039468 A1 * | 2/2006 | Emerson et al. | 375/240.01 |
| 2006/0095224 A1 | 5/2006 | Lambert | |
| 2006/0156054 A1 | 7/2006 | Brown et al. | |
| 2006/0179184 A1 * | 8/2006 | Fields et al. | 710/36 |
| 2006/0200471 A1 * | 9/2006 | Holland et al. | 707/10 |

FOREIGN PATENT DOCUMENTS

| | | |
|---|---|---|
| JP | 58181395 | 10/1983 |
| WO | WO 03023561 | 3/2003 |

OTHER PUBLICATIONS

Kistler, "Console over Ethernet", 2003, IBM, p. 1-16.*
PCT International Search Report and Written Opinion for PCT/US2006/007287; Intl Fling Date: Feb. 28, 2006; Mailing Date: Jul. 6, 2006 (11 pages).
U.S. Appl. No. 11/073,342 filed Mar. 4, 2005, Method and Apparatus for Communicating between an Agent and a Remote Management Module in a Processing System.
U.S. Appl. No. 11/073,293 filed Mar. 4, 2005, Storage of Administrative Data on a Remote Management Device.
U.S. Appl. No. 11/074,229 filed Mar. 4, 2005, Configuring a Remote Management Module in a Processing System.
U.S. Appl. No. 11/073,260 filed Mar. 4, 2005, Method and Apparatus for Boot Image Selection and Recovery Via a Remote Management Module.
PCT International Search Report and Written Opinion for PCT/US2006/007231; Intl Filing Date: Feb. 28, 2006; Mailing Date: Aug. 7, 2006 (8 pages).
Co-pending U.S. Appl. No. 11/073,342 filed Mar. 4, 2005.
Co-pending U.S. Appl. No. 11/074,229 filed Mach 4, 2005.
Co-pending U.S. Appl. No. 11/073,293 filed Mar. 4, 2005.
Co-pending U.S. Appl. No. 11/073,260 filed Mar. 4, 2005.
Notice of Allowance Mailed Oct. 28, 2008 in Co-pending U.S. Appl. No. 11/073,260 filed Mar. 4, 2005.
Notice of Allowance Mailed Jul. 15, 2008 in Co-pending U.S. Appl. No. 11/073,260 filed Mar. 4, 2005.
Final Office Action mailed Jul. 23, 2009 in Co-pending U.S. Appl. No. 11/073,342 filed Mar. 4, 2005.
Final Office Action Mailed Feb. 3, 2010 in Co-pending U.S. Appl. No. 11/074,229 filed Mar. 4, 2005.
Final Office Action Mailed Feb. 25, 2009 in Co-pending U.S. Appl. No. 11/074,229 filed Mar. 4, 2005.
Final Office Action Mailed Mar. 31, 2008 in Co-pending U.S. Appl. No. 11/074,229 filed Mar. 4, 2005.
Non-Final Office Action mailed Dec. 3, 2009 in Co-pending U.S. Appl. No. 11/073,342 filed Mar. 4, 2005.
Non-Final Office Action mailed Dec. 17, 2008 in Co-pending U.S. Appl. No. 11/073,342 filed Mar. 4, 2005.
Non-Final Office Action mailed Jul. 2, 2008 in Co-pending U.S. Appl. No. 11/073,342 filed Mar. 4, 2005.
Non-Final Office Action Mailed Aug. 13, 2009 in Co-pending U.S. Appl. No. 11/074,229 filed Mar. 4, 2005.
Non-Final Office Action Mailed Aug. 18, 2008 in Co-pending U.S. Appl. No. 11/074,229 filed Mar. 4, 2005.
Non-Final Office Action Mailed Oct. 30, 2007 in Co-pending U.S. Appl. No. 11/074,229 filed Mar. 4, 2005.
Non-Final Office Action Mailed Sep. 28, 2009 in Co-pending U.S. Appl. No. 11/073,293 filed Mar. 4, 2005.
Non-Final Office Action Mailed Feb. 5, 2008 in Co-pending U.S. Appl. No. 11/073,260 filed Mar. 4, 2005.
Non-Final Office Action Mailed Jul. 26, 2007 in Co-pending U.S. Appl. No. 11/073,260 filed Mar. 4, 2005.
Final Office Artion mailed May 25, 2010 in Co-Pending U.S. Appl. No. 11/073,342, filed Mar. 4, 2005.
Non-Final Office Action mailed May 25, 2010 in Co-Pending U.S. Appl. No. 11/073,293, filed Mar. 4, 2005.
Non-Final Office Action Mailed Jul. 2, 2010 in Co-Pending U.S. Appl. No. 11/074,229 filed Mar. 4, 2005.

* cited by examiner

PROTECTING DATA TRANSACTIONS ON AN INTEGRATED CIRCUIT BUS

CROSS REFERENCE TO RELATED APPLICATIONS

This application is related to U.S. patent application Ser. No. 11/073,342 entitled, "Method and Apparatus for Communicating Between an Agent and a Remote Management Module in a Processing System," filed on Mar. 4, 2005, hereby incorporated by reference in its entirety.

TECHNICAL FIELD

Embodiments of the present invention relate to storage systems, and in particular, to protecting data transactions on storage systems.

BACKGROUND

The Open System Interconnection (OSI) model is a well-known seven-layer framework for defining communication protocols. For example, one communication protocol, such as Transmission Control Protocol/Internet Protocol (TCP/IP), is mapped to the transport layer and network layer of the OSI model, respectively. Specifically, the transport layer ensures that packets transmitted from a source computer to a destination computer are received by the destination computer in the correct order. The network layer determines the packet format and the addressing scheme of the source and destination computers.

The lower layers of the OSI model include the data link layer and the physical layer. A communication protocol corresponding to the data link layer defines how the packets are decoded and encoded into bits. Further, a communication protocol corresponding to the physical link layer defines the electrical and mechanical specifications for transmitting a bit stream. From a bottom-up viewpoint of the OSI model, the OSI model includes the physical, data link, network, and transport layers. Accordingly, the source and destination computers that implement the communication protocols of the bottom four layers of the OSI model can communication information.

When communicating a bit stream of information between the source and destination computers, or from one source component to a destination component within a single computer, the bit stream may be affected by magnetic fields and other natural phenomena, thereby potentially causing a bit flip. The bit flip results in erroneous information received at a destination computer or destination component.

To alleviate bit flip problems, some data link layer communication protocols include error checking capabilities. However, other data link layer communication protocols are not capable to alleviating bit flip problems. An exemplary data link layer communication protocol that does not solve such problems is a communication protocol operating over an integrated circuit bus between components of a motherboard of a computer.

A solution to protect against such problems is to provide error checking microcode that is stored in a component of the motherboard. However, providing the microcode requires extra circuitry on the motherboard, which may lead to extra processing cycles by the destination component and an overall increase in the power consumption of the motherboard. The extra circuitry also increases the overall complexity of the motherboard design. For example, by adding extra circuitry, motherboard production costs increase, which leads to an overall increase of the cost of the computer. Finally, complex microcode incurs a software development cost that increases over time because of the need to maintain the microcode.

Thus, what is needed is a solution addressing the communication of erroneous information over an integrated circuit bus of a computer that is simple to implement and maintain while having low power consumption.

SUMMARY

Embodiments of the present invention provide a method and a system for protecting data transactions on an integrated circuit bus. Such data protection can be implemented by a data integrity protocol having a data protection format herein described. It should be appreciated that the present invention can be implemented in numerous ways, such as a process, an apparatus, a system, a device or a method on a computer readable medium. Several inventive embodiments of the present invention are described below.

In an embodiment of a method of formatting data on an integrated circuit bus, the embodiment includes initiating communication between a first controller and a second controller. Further, the embodiment includes communicating protected data between the first controller and the second controller. The first and the second controller are capable of communicating the protected data by using the integrated circuit bus. The protected data includes a first data chunk and a second data chunk such that the second data chunk is a complement of the first data chunk.

In an embodiment of a method of communicating data, the embodiment includes initiating communication between a first component and a second component and transmitting data and complemented data on an integrated circuit bus from the first component to the second component. The data and the complemented data are compared by the second component to determine an error.

In an embodiment of a system for protecting data communicated over an integrated circuit bus includes a first controller of a system board operating as a master for transmitting data and complemented data and a second controller of the system board. The second controller is connected to the first controller via the integrated circuit bus, such that the second controller operates as a slave for receiving the data and the complemented data. Further, the data and the complemented data are compared to detect errors.

In an embodiment of a system for formatting data on an integrated circuit bus, the embodiment includes means for initiating communication between a first controller and a second controller means for communicating protected data between the first controller and the second controller. The first and the second controller are capable of communicating the protected data by using the integrated circuit bus, such that the protected data includes a first data chunk and a second data chunk. The second data chunk is a complement of the first data chunk.

In an embodiment of a computer readable medium having stored thereon instructions capable of being executed by a computer system, the embodiment includes instructions for communicating a first data chunk over an integrated circuit bus from a first controller to a second controller. Further, the embodiment includes instructions for communicating a complemented second data chunk over the integrated circuit bus from the first controller to the second controller. The complemented second data chunk is compared with the first data chunk to determine whether an error occurred during the communication.

Other aspects of the invention will become apparent from the following detailed description taken in conjunction with the accompanying drawings, which illustrates by way of example, the principles of the invention.

DETAILED DESCRIPTION

The following embodiments describe a method and a system for protecting data transactions on an integrated circuit bus. Such data protection can be implemented by a data integrity protocol having a data protection format herein described. It will be apparent, however, to one skilled in the art, that embodiments of the present invention may be practiced without some or all of these specific details. In other instances, well known process operations have not been described in detail in order not to obscure the embodiments of the present invention described herein.

Figure 1:
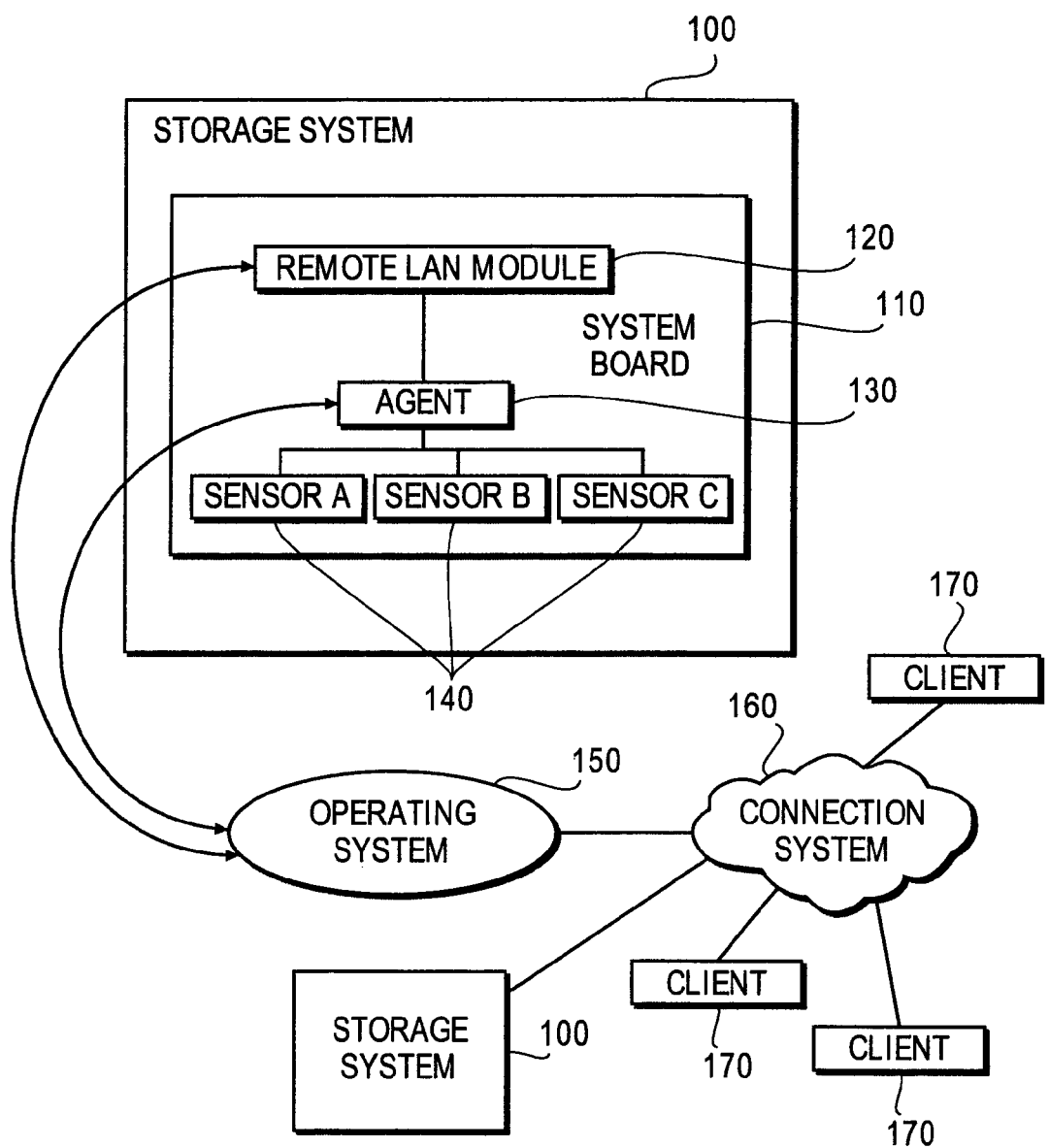
FIG. 1 is a diagram illustrating a networked storage system, in accordance with an embodiment of the invention.

FIG. 1 is a diagram illustrating a networked storage system, in accordance with an embodiment of the invention. A storage system 100, such as devices commercially available from Network Appliance, Inc of Sunnyvale, Calif. can be connected to other storage systems 100 and at least one client 170. Devices, such as the storage system 100 and clients 170 are computers that communicate with one another via a connection system 160. Further, the teachings of this invention can be adapted to a variety of storage system architectures including, but not limited to, a network-attached storage environment (NAS), storage area network (SAN), and disk assembly directly-attached to the client 170. The term "storage system" should therefore be taken broadly to include such arrangements in addition to any subsystems configured to perform a storage function and associated with other equipment or systems.

The connection system 160 is implemented with any type of connectivity method, such as a wire-based connection, such as copper, fiber optic, or other suitable media. Alternatively, the connectivity method can be a wireless connection, such as infrared, Bluetooth, or Wi-Fi. Thus, any suitable connection method between the storage system 100 and the client 170 is possible, as long as communication is enabled between the devices of the computing environment.

Exemplary architectures enabling communication on the connection system 160 include Ethernet or Fibre Channel (FC). Each client 170 may communicate with the storage system 100 over the connection system 160 by exchanging discrete frames or packets of data, according to multiple protocols, such as Transmission Control Protocol/Internet Protocol (TCP/IP) and the like. As previously described, the storage system 100 may be described as a computer that is configured to execute software applications. Alternatively, the storage system 100 can be described as an appliance, filer, storage server, or similar device that manages stored data. For example, the client 170 may interact with the storage system 100 in accordance with a client/server model of information delivery.

Specifically, the client 170 may request the services of the storage system 100, and the storage system 100 may return the results of the services requested by the client 170, by exchanging packets over the connection system 160. The client 170 may issue packets including file-based access protocols, such as the Common Internet File System (CIFS) protocol or Network File System (NFS) protocol, over TCP/IP when accessing information in the form of files and directories. Alternatively, the client 170 may issue packets including block-based access protocols, such as Small Computer Systems Interface (SCSI) protocol encapsulated over TCP (iSCSI) and SCSI encapsulated over Fibre Channel (FCP), when accessing information in the form of blocks.

The storage system 100 is coupled to any number of disks (not shown). Further, the storage system 100 provides storage services relating to the organization of information on the disks. The disks that store information may be any suitable writeable storage device media such as tape, optical media, magnetic media, electronic random access memory, micro-electro mechanical, and any other similar media adapted to store information, including data and parity information. The disks can connect to the storage system 100 using any suitable connection method, such as a Fibre Channel (FC) serial link topology. Further, the disks are logically grouped within a logical volume/file system, such that each group may be operated as a Redundant Array of Independent (or Inexpensive) Disks (RAID). The storage system 100 further includes various components (not shown), such as at least one processor, a network adapter, and a storage adapter that are connected together. It should be appreciated that the memory can include Random Access Memory (RAM), Non-Volatile Random Access Memory (NVRAM), and caches.

As illustrated in FIG. 1, the storage system 100 includes a system board 110, sometimes referred to as a motherboard. Other than the components described above, the system board 110 includes a Remote Management Module (RMM), such as Remote LAN Module (RLM) 120. The RLM 120 is coupled to an agent 130 via an integrated circuit bus. For example, an integrated circuit bus provides communications capability between components, such as any of a variety of physical interconnects, whether implemented with copper, fiber, or other signaling media. In one exemplary embodiment, the RLM 120 and the agent 130 include hardware components, but also include software components, whether stored as microcode on hardware, or operating as software of the operating system 150. Specifically, the agent 130, utilizing the data integrity protocol described herein includes a software component that logically compares data values and complemented data values, which will be later described. However, in other exemplary embodiments, the RLM 120 and the agent 130 can be implemented only with hardware. The agent 130 is further coupled to multiple sensors 140, such as sensor A, sensor B, and sensor C. The sensors 140 are used to detect changes in the state of various environmental variables in the storage System 100, such as temperatures, voltages, binary states, and the like. The RLM 120, agent 130, and sensors 140 are described in U.S. patent application Ser. No. 11/073,342 entitled, Method and Apparatus for Communicating Between an Agent and a Remote Management Module in a Processing System, filed on Mar. 4, 2005, hereby incorporated by reference in its entirety.

Embodiments of the present invention contemplate the data integrity protocol implemented over the integrated circuit bus of the system board 110. Thus, in one embodiment of the present invention, data transactions occurring between the RLM 120 and the agent 130 are protected by the use of the data integrity protocol. In one exemplary embodiment, the RLM 120 and the agent 130 can be referred to as a first controller and a second controller, respectively. Such controllers can be implemented as hardware that is a component of the system board 110, or as a hardware component of the system board 110 in combination with software, as long as data is protected during communication over the integrated circuit bus. Thus, it should be appreciated that the data integrity protocol can protect data transactions on an integrated circuit bus between any components of the motherboard. Further examples of such components will be described with respect to FIG. 2.

The storage system 100 is managed by an operating system 150, which communicates with components of the system board 110, such as NetApp® Data ONTAP™ operating system, which is available from Network Appliance, Inc., of Sunnyvale, Calif. The exemplary storage operating system from NetApp implements a Write Anywhere File Layout (WAFL™) file system. However, it is expressly contemplated that any appropriate operating system may be enhanced for use in accordance with the inventive principles described herein. As such, where the terms "Data ONTAP" or "WAFL" is employed, it should be taken broadly to refer to any operating system that is otherwise adaptable to the teachings of this invention.

Figure 2:
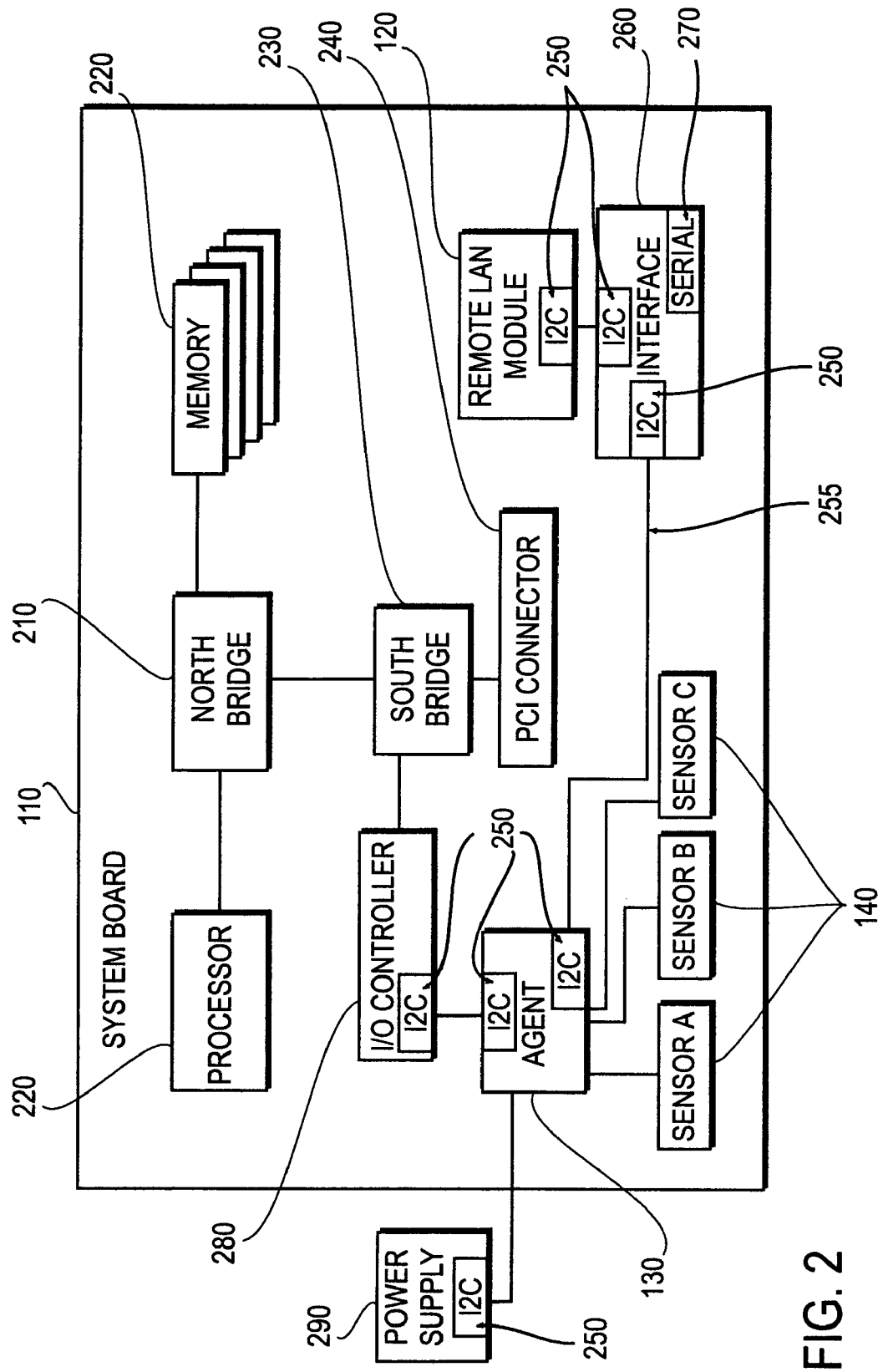
FIG. 2 is a diagram illustrating a system board of a storage system, in accordance with an embodiment of the invention.

FIG. 2 is a diagram illustrating the system board 110 of the storage system 100, in accordance with an embodiment of the invention. The system board 110 includes a variety of components that may be modified in other embodiments of the present invention. Such modifications include adding or removing components. Further, it should be appreciated that the components can be coupled together in any configuration, as long as the configuration implements an integrated circuit bus. In one exemplary embodiment, at least one processor 200 is coupled to a northbridge 210, which connects memory 220 to other components that are coupled to a southbridge 230. The southbridge 230 thus makes accessible to the processor 200, a Peripheral Component Interconnect (PCI) connector 240, the RLM 120, an interface 260 having a serial interface 270, sensors 140, the agent 130, and an I/O controller 280. Further, a power supply 290 is connected to the system board 110 to provide power to operate the components of the system board 110. The power supply 290 continues to power the RLM 120 and the agent 130 even when the remainder of the system board 110 components receive no power. Thus, the RLM 120 and the agent 130 can continuously perform RMM functions, such as turning off and turning on the storage system 100.

On various components, such as the RLM 120 and interface 260, the components include an Inter-Integrated Circuit (I²C) interface 250. In an exemplary embodiment of the present invention, the I²C interfaces 250 are used to connect components of an I²C bus to a connector 255, well known to those of ordinary skill in the art. However, it is expressly contemplated that any integrated circuit bus, such as I²C, or other communication protocol, can implement the data integrity protocol to protect data communicated over the integrated circuit bus.

In the embodiment of FIG. 2, the connectors 255 between any two I²C interfaces 250 implement the I²C bus. Specifically, the I²C bus permits components connected to the same bus to control the transmission of data by behaving as masters and slaves during data transactions. For example, when the RLM 120 and the agent 130 communicate data during a data transaction, such as during read data transactions or write data transactions, the RLM 120 can be the master and the agent 130 can be the slave, which can each control the transmission of data by the indication of various bits of a data protection format. Thus, in an exemplary embodiment of the present invention, the data integrity protocol can be implemented in a single master, multiple slave environment. In another exemplary embodiment, the data integrity protocol can be implemented in a multiple master, multiple slave environment.

Figure 3:
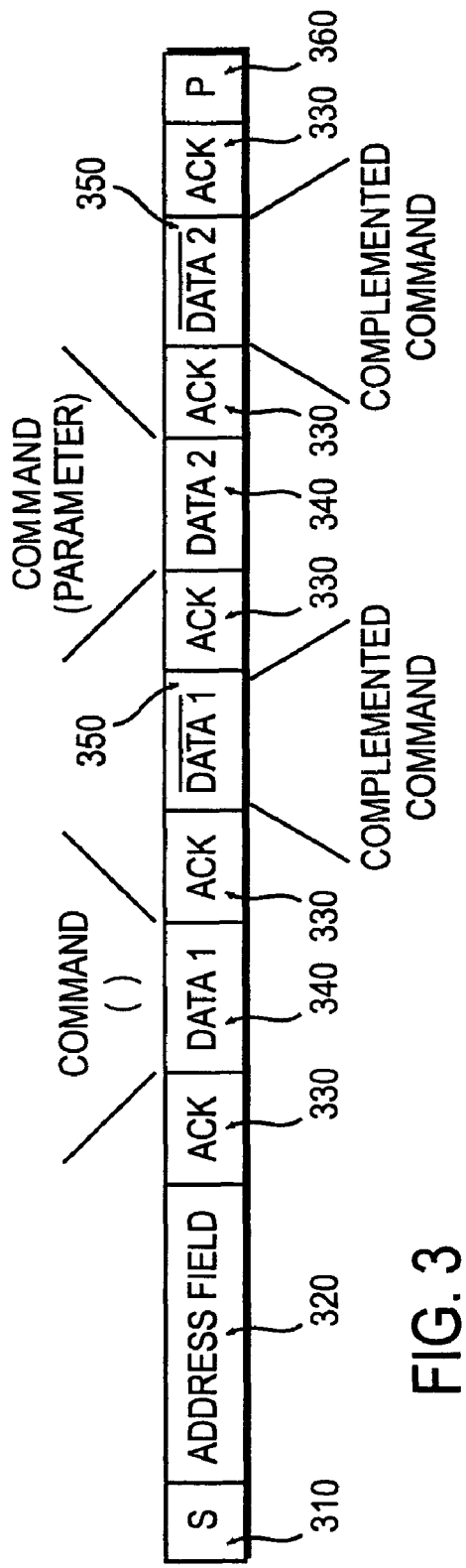
FIG. 3 is a diagram illustrating a data protection format, in accordance with an embodiment of the invention.

FIG. 3 is a diagram illustrating a data protection format, in accordance with an embodiment of the invention. The data protection format is implemented according to the data integrity protocol referred to in FIGS. 5 and 6. Specifically, the data protection format includes a start (S) bit 310, an address field 320, an acknowledgement (A) bit 330, data 340, complemented data 350, and a stop (P) bit 360. The data 340 can further include a command without a parameter, represented as "command( )" or command with a parameter, represented as "command (parameter)." Further, the completed data 350 is a complement of the "command( )" and not "command (parameter)." For example, the data 340 can represent commands, such as "turn off storage system" or "turn on storage system." The data 340 can also represent other commands with or without parameters, such as reboot storage system, read(register), and enable or disable the sensors 140. Moreover, the commands and parameters are definable and permit the granular control of and access to the components of the system board 110, as long as the integrated circuit bus connects the components and implements the data integrity protocol. Further, as an example, it should be appreciated that without the implementation of the data integrity protocol having commands and complemented commands described herein, if an erroneous bit flip occurs within the data 340, then the storage system 100 may be inadvertently shutdown.

In exemplary embodiments of the present invention, the commands and parameters are implemented as bytes. Correspondingly, the complemented commands are implemented as bytes. If the command and parameter are implemented as bytes, then each is capable of 256 commands and 256 parameters, respectively. Of course, other implementations than bytes are possible. For example, groups of bytes permitting more commands and parameters are possible, as long as the command is complemented for transmission during the data transaction over the integrated circuit bus.

In between data 340 and complemented data 350, is an acknowledgement bit 330 or a non-acknowledgement (N) bits (not shown), depending on the data transaction. Specifically, in certain embodiments of the present invention, the non-acknowledge bit can indicate when a data transaction fails instead of using acknowledgement bits 330.

Figure 4:
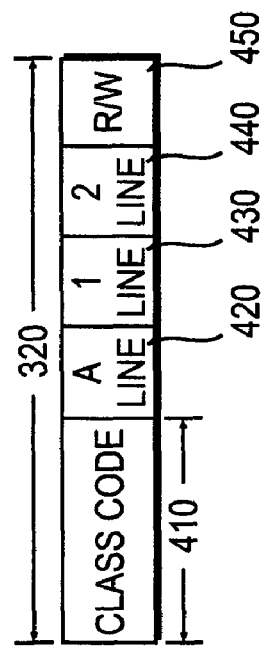
FIG. 4 is a diagram illustrating an address field of the data protection format, in accordance with an embodiment of the invention.

Further, FIG. 4 is a diagram illustrating the address field of the data protection format, in accordance with an embodiment of the invention. The address field 320 includes class code 410 bits that are used for any addressing scheme to identify components. In addition to the class code bits 410, the address field 320 includes preamble bits which are programmable (e.g. via pin strapping), such as an A-line bit 420, 1-line bit 430, and 2-line bit 440. The address field 320 also includes a read/write (R/W) bit 450. The A-line bit 420, 1-line bit 430, and 2-line bit 440 correspond to pins (not shown) of the I²C interface 250 (FIG. 2). Further, the R/W bit 450 indicates whether the data transaction is a read or write request. For example, 1 indicates read data transactions and 0 indicates write data transactions. Of course, alternative embodiments can reverse the bits to indicate 1 for write data transactions and 0 for read data transactions. Thus, it should be appreciated that any examples described herein with bit values are exemplary.

The data integrity protocol of the embodiments of the present invention operates by the master or slave supplying acknowledgement bits 330 depending on the type of data transaction. For example, during a write data transaction, the slave, such as the agent 130, supplies the acknowledgement bits 330. Alternatively, during a read data transaction, the master, such as the RLM 120, supplies the acknowledgement bits 330. Thus, it is illustrative to consider FIG. 5 and FIG. 6 to describe the operation of read and write data operations over the integrated circuit bus implementing the transmission of data and complemented data to protect data from problems such as erroneous bit flips.

Figure 5:
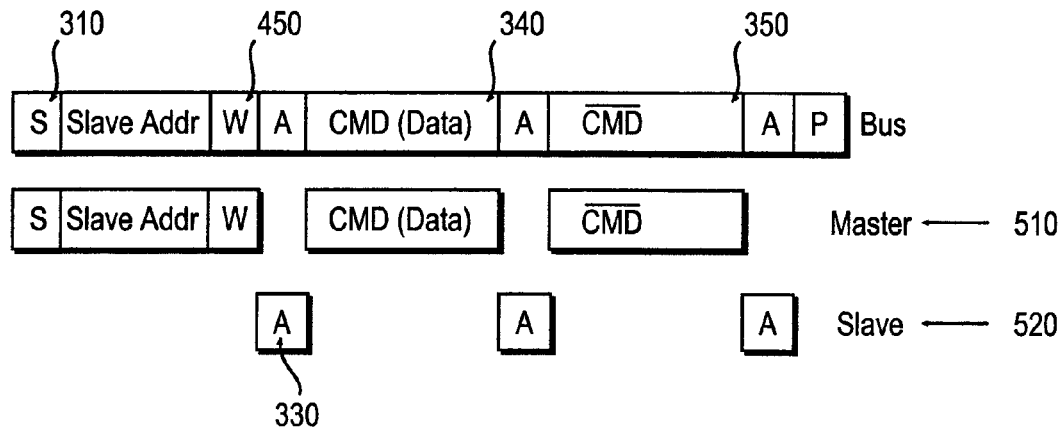
FIG. 5 is a diagram illustrating a write data transaction communicated with a data protection format, in accordance with an embodiment of the invention.

FIG. 5 is a diagram illustrating a write data transaction communicated with a data protection format, in accordance with an embodiment of the invention. Specifically, in an exemplary embodiment, a master 510 initiates a write command, as indicated by the R/W bit 450. Specifically, the write command is directed to a slave address. If any errors occur in the start bit 310 or the first 7 bits of the address field, then the correct slave will never receive the write command. Thus, the correct slave 520 will not respond with an acknowledgement bit 330 and the write data transaction ends. Alternatively, to avoid incorrectly communicating the write command to a slave, careful selection of the slave addresses during the design phase of the system prevents corruption from accessing the incorrect slave. For example, if there are two slave devices in the system, then the first slave address can be "0100." Further, the second slave address can be "0111." Accordingly, if there is a single bit error in the address of the second slave, then the first slave will probably not receive the write command.

However, if only the R/W bit 450 is incorrectly changed into a read command, then the receiving slave 520 understands that the master 510 should supply acknowledgements. Specifically, because the master 510 is waiting for the slave 520 to acknowledge and vice versa, neither the master 510 or the slave 520 supplies an acknowledgment and the transaction will timeout. Consequently, the write data transaction will be reinitiated (i.e. the original write data transaction is voided).

Errors can occur in the data 340 and the complemented data 350 transmission. However, upon receipt of the data 340 and the complemented data 350, logical operations such as XOR or some other suitable logical operation, determines whether there was a change in either the data 340 or complemented data 350. Specifically, if "data XOR complemented data" does not result in one, then there was an error during transmission. For example, data 340 can be "10001111" and complemented data 350 can be "01110000," such as the 1's complement of the data 340. However, it should be appreciated that any suitable number representation is possible, as long as the number representation of the data 340 and complemented data 350, when operated upon by a suitable logical comparison, permits the detection of differences. For example, the logical comparison using XOR results in "11111111," indicating no errors. Of course, it should be appreciated that an error could have occurred in the data 340 and the complemented data 350, thus leading to an erroneous result of "11111111." However, triple redundancy, or more, whereby data 340 is transmitted twice along with the complemented data 350, and then logically compared with one another can indicate such errors.

It should be appreciated that the logical comparison can be performed on the fly, such as the transmission of each data 340 and complemented data 350, or after the collection of the completed transmission all data 340 and complemented data 350 in a buffer (not shown) of a component. Alternative embodiments to protect data transmitted on an integrated circuit bus also include the transmission of a Cyclic Redundancy Check (CRC) value in addition to the transmission of complemented data. However, the transmission of a CRC value adds complexity to the detection of an error. Thus, it should be appreciated that the any implementation of the data integrity protocol over an integrated circuit bus is possible, as long as errors are detected using minimal complexity.

Figure 6:
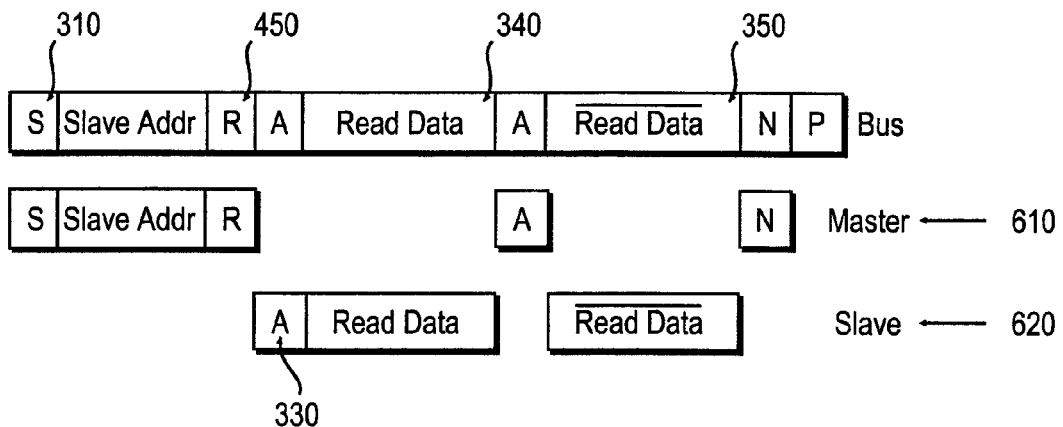
FIG. 6 is a diagram illustrating a read data transaction communicated with a data protection format, in accordance with an embodiment of the invention.

FIG. 6 is a diagram illustrating a read data transaction communicated with a data protection format, in accordance with an embodiment of the invention. Specifically, a master 610 initiates a read command, as indicated by the R/W bit 450, which is incorrectly determined by the slave 620 as a write command. In this example, the master 610 supplies acknowledgements, except for the address field 320. Specifically, the slave 620 will acknowledge the address because it erroneously received a write command. If there is an error in the start bit 310 or the first 7 bits of the address field, then the intended slave 620 will never receive the read command. To prevent the erroneous communication of the read command to an unintended slave, careful selection of the addresses of the slaves during the establishment of the system lowers the likelihood that a single bit error in the address bits causes the communication to an unintended slave. For example, if there are two slave devices in the system, then the first slave address can be "0100." Further, the second slave address can be "0111." Accordingly, if there is a single bit error in the address of the second slave, then the first slave will probably not receive the read command. Thereafter, if errors occur in the data 340, then once again, comparison with the complemented data 350 transmitted after the data 340 protects the data transaction, similar to the implementation of logical operations described above with respect to FIG. 5.

Figure 7:
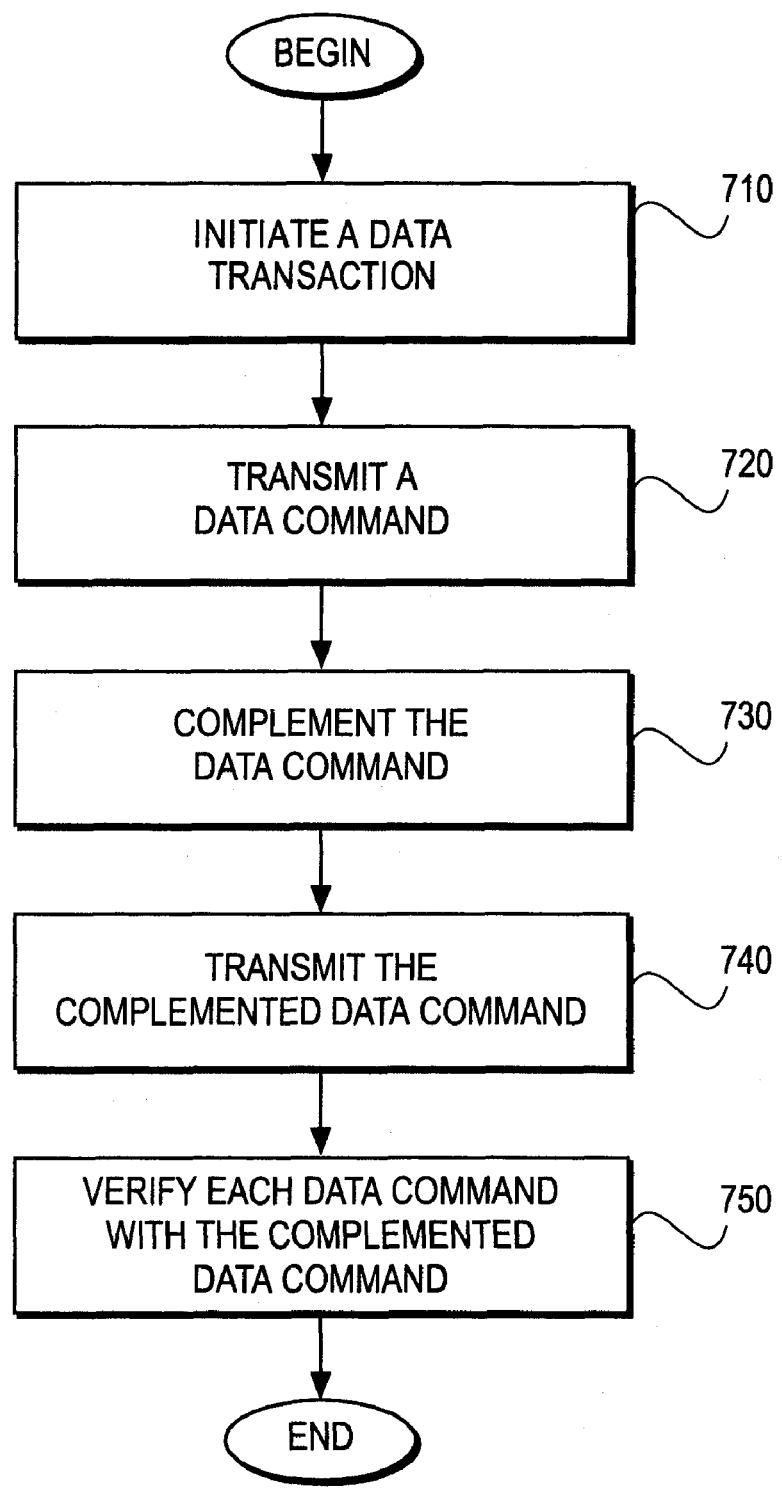
FIG. 7 is a flowchart diagram of operations for protecting data transactions on an integrated circuit bus, in accordance with an embodiment of the invention.

FIG. 7 is a flowchart diagram of operations for protecting data transactions on an integrated circuit bus, in accordance with an embodiment of the invention. Specifically, two components, such as a first controller and a second controller of a system board are connected by an integrated circuit bus. When the first controller initiates a data transaction with the second controller, the data integrity protocol begins with operation 710. Specifically, the data transaction would be a read or write data transaction that includes the transmission of at last one command and the complement of the command. In operation 720, the first controller transmits the command as a data command. The data command, which is the first chunk of the protected data is later compared with the second chunk of the protected data. In particular, in operation 730, the first controller generates the complement of the data command, which is the second data chunk. Then, in operation 740, the first controller transmits the complemented data command to the second controller. Consequently, in operation 750, whether the data commands and complemented data commands are all received and stored in a buffer, or if processed on the fly (i.e. the receipt of each pair of first and second chunks), the second controller verifies each data command with the associated complemented data command. Thereafter, the operations end.

With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared, and similarly manipulated.

Any of the operations described herein are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code, such as instructions, on a computer readable medium. The computer readable medium is any data storage device that can store data, such as disks, which can be thereafter be read by a computer system. Examples of the computer readable medium include hard drives, network attached storage (NAS), Storage Area Networks (SANs), read-only memory, random-access memory, CD-ROMs, CD-Rs, CD-RWs, magnetic tapes and other optical and non-optical data storage media. The computer readable medium can also be distributed over a network-coupled computer system, such as a storage cluster, so that the computer readable code is stored and executed in a distributed fashion. The computer readable medium can also be distributed using a switching fabric, such as used in Linux® compute farms.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method comprising:
    initiating communication between a remote management module and an agent within a network storage system, wherein the remote management module and the agent cooperatively implement an abstraction layer through which protected data is communicated over an integrated circuit bus to allow the remote management module to be platform independent and compatible with a plurality of different network storage systems, and
    wherein the agent is positioned between control circuitry of the network storage system and the remote management module within the network storage system, and wherein the agent is configured to monitor system events in the network storage system and act as an intermediary between the remote management module and the control circuitry of the network storage system, wherein the agent includes a buffer to implement the abstraction layer using a packet protocol in which data is queued in the buffer upon a system event and de-queued upon request by the Remote Management Module in response to an interrupt asserted by the agent, the network storage system for servicing a plurality of storage clients over a network;
    wherein the remote management module is coupled with a remote administrative console connected to a communications port of the network storage system to allow communication between the remote administrative console and the remote management module over a network to permit a user of the remote administrative console to access and manage the network storage system from a remote location,
    communicating protected data between the remote management module and the agent, wherein the remote management module and the agent are configured to prevent errors by communicating protected data over the integrated circuit bus, wherein the protected data includes a first data chunk and a second data chunk, the second data chunk being a complement of the first data chunk, the second data chunk for use in verification of the protected data; and
    detecting an error by comparing data in the first data chunk with data in the second data chunk after concurrently storing the first data chunk and the second data chunk in a buffer.

2. The method of claim 1, wherein communicating protected data further includes communicating an acknowledgement chunk after each of the first data chunk and the second data chunk.

3. The method of claim 1, wherein the integrated circuit bus is an I2C bus.

4. The method of claim 1, wherein the remote management module and the agent each receive power independently of other elements on the system board.

5. The method of claim 1, wherein the first chunk and the second chunk each include a plurality of bytes.

6. The method of claim 1, wherein the communicating of the second data chunk is not performed until an acknowledgement of the first data chunk is received.

7. The method of claim 1, wherein monitoring the network storage system includes detecting changes in the state of environmental variables in the storage system including voltages, binary states, and the presence or absence of various components within the storage server.

8. The method of claim 1, wherein the agent acts as an intermediary between the remote management module and control circuitry of the network storage system using user-definable commands that permit granularity control and access to the components of the network storage system.

9. The method of claim 1, further comprising:
    communicating one of a read data transaction and a write data transaction during the communication of a plurality of the protected data.

10. The method of claim 9, further including:
    detecting a difference between the first data chunk and the second data chunk.

11. The method of claim 10, wherein detecting the difference further includes voiding a transaction of the communication of a plurality of the protected data.

12. The method of claim 11, wherein each first data chunk and second data chunk is communicated until all the plurality of protected data are logically compared.

13. The method of claim 11, wherein voiding a transaction includes disregarding data after an invalid result of data comparison of the first chunk with the second chunk or a time-based data disregard procedure.

14. An article of manufacture comprising:
    a computer readable storage medium, having encoded and stored thereon, instructions, capable of being executed by a computer system, the instructions comprising:
    instructions for communicating a first data chunk in a packet using a data integrity protocol over an integrated circuit bus within a storage server from a remote management module to an agent, wherein the remote management module and the agent cooperatively implement an abstraction layer through which protected data is communicated over the integrated circuit bus to allow the remote management module to be platform independent and compatible with a plurality of different storage servers, and wherein the agent is positioned between control circuitry of the storage server and the remote management module, and wherein the agent is configured to monitor system events in the storage server and act as an intermediary between the remote management module and the control circuitry of the storage server, wherein the agent includes a buffer to implement the abstraction layer using a packet protocol in which data is queued in the buffer upon a system event and de-queued upon request by the Remote Management Module in response to an interrupt asserted by the agent, the network storage system for servicing a plurality of storage clients over a first network, and wherein the remote management module is coupled with a remote administrative console connected to a communications port of the storage server to allow direct communication between the remote administrative console and the remote management module over a second network to permit a user of the remote administrative console to access and manage the storage server from a remote location; and instructions for communicating a second data chunk that is a complement of the first data chunk in the same packet with the first data chunk using the data protection protocol over the integrated circuit bus from the remote management module to the agent, wherein the communicating of the second data chunk is not performed until an acknowledgement of the first data chunk is received, wherein the second data chunk is compared with first data chunk after concurrently storing the first data chunk and the second data chunk in a buffer to determine whether an error occurred during the communication.

15. The method of claim 14, wherein the remote management module and the agent receive power independently of other elements on the system board.

16. The method of claim 14, wherein the first data chunk and the second data chunk each include a plurality of bytes.

17. A system for protecting data communicated over an integrated circuit bus, comprising:

a storage server coupled locally to a storage subsystem which includes a set of mass storage devices and is coupled to a set of storage clients through a first network;

a remote administrative console coupled to a communication port of the storage server to allow communication between the remote administrative console and the storage server through a second network, the remote administrative console to enable a user of the remote administrative console to perform management functions on the storage server, wherein the storage server operates on behalf of the clients to store and manage shared data in the set of mass storage devices, the storage server including:

a remote management module within the storage server operating as a master for transmitting data and complemented data as part of a protected data transaction, the remote management module configured to:
  delay the transmitting of the complemented data until an acknowledgement of the data is received; and
  cancel the data transaction if the acknowledgement of the data is not received within a predetermined period of time; and an agent coupled with the remote management module via the integrated circuit bus, wherein the agent and the remote management module cooperatively implement an abstraction layer through which the agent and the remote management module communicate protected data over the integrated circuit bus to allow the remote management module to be platform independent and compatible with a plurality of different storage servers, wherein the agent is positioned between control circuitry of the storage server and the remote management module, and wherein the agent operates as a slave for receiving the data and the complemented data and acknowledging receipt of the data and complemented data, and wherein the remote management module and the agent are configured to prevent errors by communicating protected data over the integrated circuit bus, wherein the data and the complemented data are compared to detect errors during transmission, and wherein the agent is used to monitor events in the network storage system and act as an intermediary between the remote management module and control circuitry of the network storage system, and wherein the agent includes a buffer to implement the abstraction layer using a packet protocol in which data is queued in the buffer upon a system event and de-queued upon request by the Remote Management Module in response to an interrupt asserted by the agent.

18. The system of claim 17, wherein the integrated circuit bus is an I2C bus.

19. The system of claim 17, wherein the remote management module transmits acknowledgements during read data transactions.

20. The system of claim 17, wherein the agent transmits acknowledgements during write data transactions.

21. The system of claim 17, wherein the remote management module and the agent receive power independently of other elements within the network storage system.

22. The system of claim 17, wherein the data and the complemented data each include a plurality of bytes.

23. The system of claim 17, wherein the data includes a command and the complemented data includes a complement of the command, and wherein the command is user-definable and permits access to the components of the network storage system from a remote location using a data integrity protocol in a single packet over the integrated circuit bus from the remote management module to the agent.

24. A method comprising:

initiating communication within a network storage system between a remote management module and an agent to begin a data transaction over an integrated circuit bus, wherein the remote management module and the agent cooperatively implement an abstraction layer through which protected data is communicated over the integrated circuit bus to allow the remote management module to be platform independent and compatible with a plurality of different network storage systems, wherein the agent is located between control circuitry of the network storage system and the remote management module, and wherein the agent is configured to monitor system events in the network storage system and act as an intermediary between the remote management module and the control circuitry of the network storage system, wherein the agent includes a buffer to implement the abstraction layer using a packet protocol in which data is queued in the buffer upon a system event and de-queued upon request by the Remote Management Module in response to an interrupt asserted by the agent, the network storage system for servicing a plurality of storage clients via a first network, and wherein the remote management module is coupled with a remote administrative console connected to a communications port of the network storage system to allow communication between the remote administrative console and the remote management module through a second network to permit a user of the remote administrative console to access and manage the network storage system from a remote location;

transmitting a command and a complement of the command in a single packet over the integrated circuit bus from the remote management module to the agent using a data integrity protocol, wherein the command is user-definable to permit user access to, and control of, components of the network storage system from the remote administrative console, and wherein the transmitting of the complement of the command from the remote management module to the agent is performed after an acknowledgement indicating that the command is received from the agent, wherein the command and the complement of the command are compared by the agent to determine an error after concurrently storing the command and the complement of the command in a buffer; and canceling the data transaction if the acknowledgement of the data is not received within a predetermined period of time.

25. The method of claim 24, wherein the agent is being operated by software.

26. The method of claim 24, wherein the command and the complement of the command are compared by a logical operation.

27. The method of claim 24, wherein the error is a bit flip.

28. The method of claim 24, wherein the remote management module and the agent receive power independently of other elements within the network storage module.

29. The method of claim 24, wherein the command and the complement of the command each include a plurality of bytes.

30. A system comprising:

means for initiating communication within a storage server between a remote management module and an agent, wherein the remote management module is coupled with a remote administrative console connected to a communications port of the storage server to allow communication between the remote administrative console and the remote management module through a first network to permit a user of the remote administrative console to access and manage the storage server from a remote location, wherein the remote management module and the agent cooperatively implement an abstraction layer through which protected data is communicated over an integrated circuit bus to allow the remote management module to be platform independent and compatible with a plurality of different storage servers, and wherein the agent is positioned between control circuitry of the storage server and the remote management module, and wherein the agent is configured to monitor system events in the storage server and act as an intermediary between the remote management module and the control circuitry of the storage server, the storage server for servicing a plurality of storage clients via a second network, and wherein the remote management module and the agent cooperatively implement an abstraction layer through which protected data is communicated over an integrated circuit bus to allow the remote management module to be platform independent and compatible with a plurality of different network storage systems, wherein the agent includes a buffer to implement the abstraction layer using a packet protocol in which data is queued in the buffer upon a system event and de-queued upon request by the Remote Management Module in response to an interrupt asserted by the agent; and means for communicating protected data between the remote management module and the agent, wherein the remote management module and the agent communicate the protected data by using a data integrity protocol to transmit a command and a complement of the command in a single packet over the integrated circuit bus from the remote management module to the agent, wherein the command is user-definable to permit the user access to components of the storage server from a remote location via the agent using the remote management module; and means for detecting an error by comparing the command with the complement of the command after storing the command and the complement of the command in a buffer.

31. The system of claim 30, wherein the remote management module and the agent receive power independently of other elements within the network storage system.

32. The method of claim 30, wherein the command and the complement of the command each include a plurality of bytes.

33. A network storage system comprising:

a storage server coupled locally to a storage subsystem which includes a set of mass storage devices and coupled to a set of storage clients through a first network;

a remote administrative console coupled to a communication port of the storage server to allow direct communication between the remote administrative console and the storage server through a second network, the remote administrative console to enable a user of the remote administrative console to perform management functions on the storage server, wherein the storage server operates on behalf of the clients to store and manage shared data in the set of mass storage devices, the storage server including:

control circuitry to control components of the storage server;

a remote management module coupled with the remote administrative console over the second network to permit the remote user of the remote administrative console to access and manage the system storage server from a remote location;

an integrated circuit bus; and an agent coupled with the remote management module over the integrated circuit bus, wherein the agent is positioned between the control circuitry and the remote management module, and wherein the agent and the remote management module cooperatively implement an abstraction layer through which protected data is communicated over the integrated circuit bus to allow the remote management module to be platform independent and compatible with a plurality of different storage servers, and wherein the agent is configured to monitor the storage server and to act as an intermediary between the control circuitry of the storage server and the remote management module, and wherein the agent and the remote management module cooperatively implement the abstraction layer to permit users of the remote administrative console to obtain access to, and control of, the control circuitry of the network storage server via the remote management module and the agent, wherein the remote management module and the agent are configured to prevent errors by communicating protected data over the integrated circuit bus including transmitting a first data chunk and a second data chunk, the second data chunk being a complement of the first data chunk, wherein comparison logic in the agent detects an error by comparing data in the first data chunk with data in the second data chunk only after concurrently storing the first data chunk and its complement, the second data chunk in a buffer.

34. The network storage system of claim 33, wherein the integrated circuit bus is an I2C bus.

35. The network storage system of claim 34, wherein the remote management module transmits acknowledgements during read data transactions.

36. The network storage system of claim 35, wherein the agent transmits acknowledgements during write data transactions.

37. The network storage system of claim 36, wherein the remote management module and the agent receive power independently of other elements within the network storage system.

* * * * *